(12) United States Patent
Moyer

(10) Patent No.: US 8,024,620 B2
(45) Date of Patent: Sep. 20, 2011

(54) DYNAMIC ADDRESS-TYPE SELECTION CONTROL IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 302 days.

(21) Appl. No.: 12/179,629

(22) Filed: Jul. 25, 2008

(65) Prior Publication Data

US 2010/0023811 A1    Jan. 28, 2010

(51) Int. Cl.
G06F 11/00 (2006.01)
(52) U.S. Cl. .............. 714/47; 714/38; 717/124
(58) Field of Classification Search ............ 714/47, 714/38; 711/202; 717/124
See application file for complete search history.

(56) References Cited

U.S. PATENT DOCUMENTS

| | | | |
|---|---|---|---|
| 5,127,103 A | 6/1992 | Hill et al. | |
| 5,608,867 A * | 3/1997 | Ishihara | 714/47 |
| 5,630,049 A | 5/1997 | Cardoza et al. | |
| 5,636,374 A | 6/1997 | Rodgers et al. | |
| 5,694,706 A | 12/1997 | Penka | |
| 5,913,923 A | 6/1999 | Dunlap et al. | |
| 6,505,309 B1 | 1/2003 | Okabayashi et al. | |
| 6,601,189 B1 | 7/2003 | Edwards et al. | |
| 6,802,031 B2 | 10/2004 | Floyd et al. | |
| 6,808,867 B2 | 10/2004 | Doshi et al. | |
| 6,862,694 B1* | 3/2005 | Tormey et al. | 714/34 |
| 6,883,162 B2 | 4/2005 | Jackson et al. | |
| 6,918,065 B1 | 7/2005 | Edwards et al. | |
| 6,920,586 B1 | 7/2005 | Moyer | |
| 6,963,963 B2* | 11/2005 | Moyer | 711/202 |
| 7,287,194 B2 | 10/2007 | Moyer | |
| 7,296,137 B2 | 11/2007 | Moyer | |
| 7,299,335 B2 | 11/2007 | Moyer | |
| 2002/0038437 A1 | 3/2002 | Hogdal et al. | |
| 2002/0188831 A1 | 12/2002 | Jackson et al. | |
| 2004/0221269 A1 | 11/2004 | Ray et al. | |

(Continued)

FOREIGN PATENT DOCUMENTS

JP    2003271417 A    9/2003

OTHER PUBLICATIONS

PCT/US2009/041211 International Search Report and Written Opinion mailed Nov. 30, 2009 on Application Corresponding to Related U.S. Appl. No. 12/179,632.
U.S. Appl. No. 12/179,631, Non-Final Office Action mailed Oct. 13, 2010, 22 pages.

(Continued)

*Primary Examiner* — Philip Guyton

(57) ABSTRACT

A translated address and an untranslated address associated with a same processor operation are received. An address-type indicator is provided whose value is indicative of whether the translated or untranslated address is to be used for creating a debug message. The value of the address-type indicator is selectively modified in response to occurrence of one or more selected debug events. Based at least in part on the value of the address-type indicator, the translated or untranslated address is selected. The address-type indicator may be selectively overridden to select the translated or untranslated address as the selected address based on whether a process identifier is at least one of a set of process identifiers or whether at least one of the translated or untranslated address falls within one or more predetermined address ranges. A debug message is created using at least a portion of the selected address.

19 Claims, 10 Drawing Sheets

U.S. PATENT DOCUMENTS

| | | |
|---|---|---|
| 2005/0138484 A1 | 6/2005 | Moyer et al. |
| 2005/0257102 A1 | 11/2005 | Moyer et al. |
| 2006/0117224 A1 | 6/2006 | Wu |
| 2006/0174225 A1 | 8/2006 | Bennett et al. |
| 2006/0271919 A1 | 11/2006 | Moyer |
| 2007/0033577 A1 | 2/2007 | Arackal |
| 2007/0130119 A1 | 6/2007 | Phillips |
| 2008/0215920 A1 | 9/2008 | Mayer et al. |
| 2010/0023731 A1 | 1/2010 | Ito |
| 2010/0023812 A1 | 1/2010 | Moyer |

OTHER PUBLICATIONS

Morigaki, Toshihiko, "Information Processing Device and Electronic Equipment," Machine English translation of JP2003271417A, published Sep. 26, 2003, 12 pages.

Non-Final Office Action for (U.S. Appl. No. 12/179,632), Feb. 4, 2011, 30 pages.

Notice of Allowance for (U.S. Appl. No. 12/179,631), Mar. 3, 2011, 13 pages.

\* cited by examiner

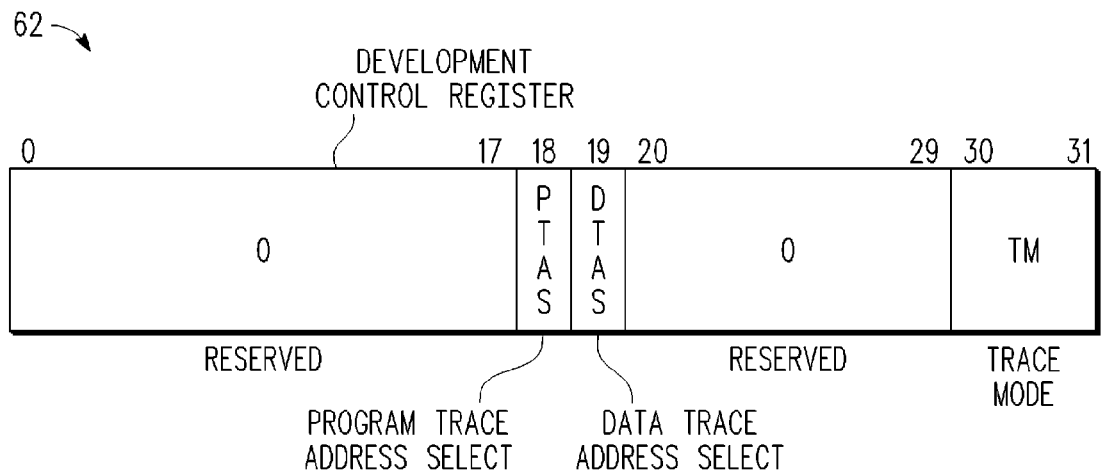

*FIG. 3*

| DC1[18] | PTAS | PTAS – PROGRAM TRACE ADDRESS TYPE SELECT<br>0 – PROGRAM TRACE MESSAGE PROVIDE LOGICAL ADDRESSES<br>1 – PROGRAM TRACE MESSAGE PROVIDE PHYSICAL ADDRESSES |
|---|---|---|
| DC1[19] | DTAS | DTAS – DATA TRACE ADDRESS TYPE SELECT<br>0 – DATA TRACE MESSAGE PROVIDE LOGICAL ADDRESSES<br>1 – DATA TRACE MESSAGE PROVIDE PHYSICAL ADDRESSES |
| DC1[30:31] | TM | TM – TRACE MODE<br>00 – NO TRACE<br>1X – PROGRAM TRACE ENABLED<br>X1 – DATA TRACE ENABLED |

| ADDRESS FIELD | ADDRESS TYPE | SEQUENCE COUNT FIELD | SOURCE PROCESSOR FIELD | TRANSFER CODE FIELD |
|---|---|---|---|---|

SELECTED ADDRESS TYPE = {ADDRESS FIELD, ADDRESS TYPE}

TRANSFER CODE FIELD = 000100

| DATA VALUE(S) | ADDRESS FIELD | ADDRESS TYPE | DATA SIZE FIELD | SOURCE PROCESSOR FIELD | TRANSFER CODE FIELD |
|---|---|---|---|---|---|

SELECTED ADDRESS TYPE = {ADDRESS FIELD, ADDRESS TYPE}

TRANSFER CODE FIELD = 000101 (DATA WRITE), 000110 (DATA READ)

82

| BIT(S) | NAME | DESCRIPTION | |
|---|---|---|---|
| 0 | IDE | IMPRECISE DEBUG EVENT<br>SET TO 1 IF DEBUG EXCEPTIONS ARE DISABLED AND A DEBUG EVENT CAUSES ITS RESPECTIVE DEBUG STATUS REGISTER BIT TO BE SET TO 1. | 176 |
| 1 | ICMP | INSTRUCTION COMPLETE DEBUG EVENT<br>SET TO 1 IF AN INSTRUCTION COMPLETE DEBUG EVENT OCCURRED. | 178 |
| 2 | BRT | BRANCH TAKEN DEBUG EVENT<br>SET TO 1 IF A BRANCH TAKEN DEBUG OCCURRED. | 180 |
| 3 | IAC1 | INSTRUCTION ADDRESS COMPARE 1 DEBUG EVENT<br>SET TO 1 IF AN IAC1 DEBUG EVENT OCCURRED. | 182 |
| 4 | IAC2 | INSTRUCTION ADDRESS COMPARE 2 DEBUG EVENT<br>SET TO 1 IF AN IAC2 DEBUG EVENT OCCURRED. | 184 |
| 5 | IAC3 | INSTRUCTION ADDRESS COMPARE 3 DEBUG EVENT<br>SET TO 1 IF AN IAC3 DEBUG EVENT OCCURRED. | 186 |
| 6 | IAC4 | INSTRUCTION ADDRESS COMPARE 4 DEBUG EVENT<br>SET TO 1 IF AN IAC4 DEBUG EVENT OCCURRED. | 188 |
| 7 | DAC1R | DATA ADDRESS COMPARE 1 READ DEBUG EVENT<br>SET TO 1 IF A READ-TYPE DAC1 DEBUG EVENT OCCURRED WHILE DBCR0[DAC1]=0b10 OR DBCR0[DAC1]=0b11 | 190 |
| 8 | DAC1W | DATA ADDRESS COMPARE 1 WRITE DEBUG EVENT<br>SET TO 1 IF A WRITE-TYPE DAC1 DEBUG EVENT OCCURRED WHILE DBCR0[DAC1]=0b01 OR DBCR0[DAC1]=0b11 | 192 |
| 9 | DAC2R | DATA ADDRESS COMPARE 2 READ DEBUG EVENT<br>SET TO 1 IF A READ-TYPE DAC2 DEBUG EVENT OCCURRED WHILE DBCR0[DAC2]=0b10 OR DBCR0[DAC2]=0b11 | 194 |
| 10 | DAC2W | DATA ADDRESS COMPARE 2 WRITE DEBUG EVENT<br>SET TO 1 IF A WRITE-TYPE DAC2 DEBUG EVENT OCCURRED WHILE DBCR0[DAC2]=0b01 OR DBCR0[DAC2]=0b11 | 196 |
| 11 | TRAP | TRAP TAKEN DEBUG EVENT<br>SET TO 1 IF A TRAP TAKEN DEBUG EVENT OCCURRED | 197 |
| 12 | DCNT1 | DEBUG COUNTER 1 DEBUG EVENT<br>SET TO 1 IF A DCNT 1 DEBUG EVENT OCCURRED | 198 |
| 13 | DCNT2 | DEBUG COUNTER 2 DEBUG EVENT<br>SET TO 1 IF A DCNT 2 DEBUG EVENT OCCURRED | 199 |
| 14-31 | - | RESERVED | 200 |

| BIT(S) | NAME | DESCRIPTION | |
|---|---|---|---|
| 0 | EDM | EXTERNAL DEBUG MODE. THIS BIT IS READ-ONLY BY SOFTWARE.<br>0-EXTERNAL DEBUG MODE DISABLED. INTERNAL DEBUG EVENTS NOT MAPPED INTO EXTERNAL DEBUG EVENTS.<br>1-EXTERNAL DEBUG MODE ENABLED. EVENTS WILL NOT CAUSE THE CPU TO VECTOR TO INTERRUPT CODE. SOFTWARE IS NOT PERMITTED TO WRITE TO DEBUG REGISTERS {DBCRx, DBSR, DBCNT1-2, IAC1-4, DAC1-2, DVC1-2}. | 152 |
| 1 | IDM | INTERNAL DEBUG MODE<br>0-DEBUG EXCEPTIONS ARE DISABLED. DEBUG EVENTS DO NOT AFFECT DBSR UNLESS EDM IS SET.<br>1-DEBUG EXCEPTIONS ARE ENABLED. ENABLED DEBUG EVENTS WILL UPDATE THE DBSR AND MAY CAUSE THE CPU TO VECTOR TO INTERRUPT CODE. SOFTWARE IS PERMITTED TO WRITE TO DEBUG REGISTERS. | 154 |
| 2:3 | RST | RESET CONTROL<br>00-NO FUNCTION<br>01-RESERVED<br>10-P_RESETOUT_B PIN ASSERTED BY DEBUG RESET CONTROL TO INITIATE PROCESSOR RESET.<br>11-RESERVED<br>NOTE: THIS FIELD IS UNCONDITIONALLY RESET ON ANY RESET CONDITION. | 156 |
| 4 | ICMP | INSTRUCTION COMPLETE DEBUG EVENT ENABLE<br>0-ICMP DEBUG EVENTS ARE DISABLED<br>1-ICMP DEBUG EVENTS ARE ENABLED | 158 |
| 5 | BRT | BRANCH TAKEN DEBUG EVENT ENABLE<br>0-BRT DEBUG EVENTS ARE DISABLED<br>1-BRT DEBUG EVENTS ARE ENABLED | 160 |
| 6 | IAC1 | INSTRUCTION ADDRESS COMPARE 1 DEBUG EVENT ENABLE<br>0-IAC1 DEBUG EVENTS ARE DISABLED<br>1-IAC1 DEBUG EVENTS ARE ENABLED | 161 |
| 7 | IAC2 | INSTRUCTION ADDRESS COMPARE 2 DEBUG EVENT ENABLE<br>0-IAC2 DEBUG EVENTS ARE DISABLED<br>1-IAC2 DEBUG EVENTS ARE ENABLED | 162 |
| 8 | IAC3 | INSTRUCTION ADDRESS COMPARE 3 DEBUG EVENT ENABLE<br>0-IAC3 DEBUG EVENTS ARE DISABLED<br>1-IAC3 DEBUG EVENTS ARE ENABLED | 163 |
| 9 | IAC4 | INSTRUCTION ADDRESS COMPARE 4 DEBUG EVENT ENABLE<br>0-IAC4 DEBUG EVENTS ARE DISABLED<br>1-IAC4 DEBUG EVENTS ARE ENABLED | 164 |

| BIT(S) | NAME | DESCRIPTION | |
|---|---|---|---|
| 10:11 | DAC1 | DATA ADDRESS COMPARE 1 DEBUG EVENT ENABLE<br>00–DAC1 DEBUG EVENTS ARE DISABLED<br>01–DAC1 DEBUG EVENTS ARE ENABLED ONLY FOR STORE-TYPE DATA STORAGE ACCESSES<br>10–DAC1 DEBUG EVENTS ARE ENABLED ONLY FOR LOAD-TYPE DATA STORAGE ACCESSES<br>11–DAC1 DEBUG EVENTS ARE ENABLED FOR LOAD-TYPE OR STORE-TYPE DATA STORAGE ACCESSES | 166 |
| 12:13 | DAC2 | DATA ADDRESS COMPARE 2 DEBUG EVENT ENABLE<br>00–DAC2 DEBUG EVENTS ARE DISABLED<br>01–DAC2 DEBUG EVENTS ARE ENABLED ONLY FOR STORE-TYPE DATA STORAGE ACCESSES<br>10–DAC2 DEBUG EVENTS ARE ENABLED ONLY FOR LOAD-TYPE DATA STORAGE ACCESSES<br>11–DAC2 DEBUG EVENTS ARE ENABLED FOR LOAD-TYPE OR STORE-TYPE DATA STORAGE ACCESSES | 168 |
| 14 | DCNT1 | DEBUG COUNTER 1 DEBUG EVENT ENABLE<br>0–COUNTER 1 DEBUG EVENTS ARE DISABLED<br>1–COUNTER 1 DEBUG EVENTS ARE ENABLED | 170 |
| 15 | DCNT2 | DEBUG COUNTER 2 DEBUG EVENT ENABLE<br>0–COUNTER 2 DEBUG EVENTS ARE DISABLED<br>1–COUNTER 2 DEBUG EVENTS ARE ENABLED | 171 |
| 16 | TRAP | TRAP TAKEN DEBUG ENABLE<br>0–TRAP DEBUG EVENTS ARE DISABLED<br>1–TRAP DEBUG EVENTS ARE ENABLED | 172 |
| 17–31 | – | RESERVED | 173 |

*FIG. 11*

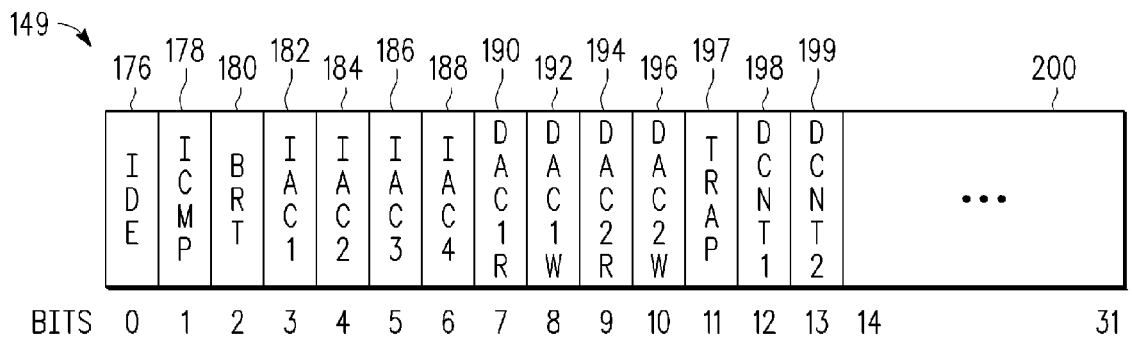

| WP0C | WP1C | WP2C | WP3C | WP4C | WP5C | WP6C | WP7C | WP8C | WP9C | |
|------|------|------|------|------|------|------|------|------|------|---|
| 31 30 29 | 28 27 26 | 25 24 23 | 22 21 20 | 19 18 17 | 16 15 14 | 13 12 11 | 10 9 8 | 7 6 5 | 4 3 2 | 1 0 |

| 31:29 | WP0C | WP0C – WATCHPOINT 0 CONTROL<br>000 – OCCURRENCE OF WATCHPOINT 0 EVENT HAS NO EFFECT ON PTAS<br>001 – OCCURRENCE OF WATCHPOINT 0 EVENT TOGGLES PTAS<br>010 – OCCURRENCE OF WATCHPOINT 0 EVENT SETS PTAS = 0<br>011 – OCCURRENCE OF WATCHPOINT 0 EVENT SETS PTAS = 1<br>1xx – RESERVED FOR DTAS CONTROL |
| ... | ... | ... |
| 4:2 | WP9C | WP9C – WATCHPOINT 9 CONTROL<br>000 – OCCURRENCE OF WATCHPOINT 9 EVENT HAS NO EFFECT ON PTAS<br>001 – OCCURRENCE OF WATCHPOINT 9 EVENT TOGGLES PTAS<br>010 – OCCURRENCE OF WATCHPOINT 9 EVENT SETS PTAS = 0<br>011 – OCCURRENCE OF WATCHPOINT 9 EVENT SETS PTAS = 1<br>1xx – RESERVED FOR DTAS CONTROL |

_US 8,024,620 B2_

DYNAMIC ADDRESS-TYPE SELECTION CONTROL IN A DATA PROCESSING SYSTEM

RELATED APPLICATIONS

This application is related to my copending U.S. patent applications filed of even date herewith and assigned to the assignee hereof:
(1) U.S. Ser. No. 12/179,632 entitled "Debug Message Generation Using A Selected Address Type"; and
(2) U.S. Ser. No. 12/179,631 entitled "Debug Trace Messaging With One Or More Characteristic Indicators".

BACKGROUND

1. Field

This disclosure relates generally to semiconductors, and more specifically, to data processing systems that implement debug circuitry for monitoring information in the system.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system is highly desirable to remain transparent to operation of the system.

Debug messages are generated by the data processing system that contain address and data information for either program events (Program Trace Messaging), or data events (Data Read Messaging, Data Write Messaging), as well as other debug information. The address information is typically virtual address information which is a format that must be translated to identify a physical memory location known as a physical address. Correlation of the address to a program undergoing execution is an important part of the debugging process so that actual program flow and the dynamic values of system data variables can be monitored. Virtual to physical address mapping or translation must be performed. However, an external debugger typically does not have the necessary virtual to physical mapping information to quickly translate the address portions of the debug messages, particularly when these mappings are dynamically changing due to demand paging or other remapping operations. The use of the virtual addresses allows a debug user a straightforward way to trace a computer program via a program listing obtained by a compile and link function which uses virtual addresses for text and data sections of the software application. The user typically has no knowledge of how the virtual addresses are translated to physical addresses by an operating system (OS). Therefore, tracing is required to indicate virtual addresses. Unfortunately certain program listings are unavailable, such as program listings for pre-compiled software modules which are executed at runtime. Examples of such modules are OS calls and library functions. In such an example, no program listing is available. Thus it is very difficult to properly trace and interpret these sections of the executed program. Correct translation of a virtual address to a physical address requires knowing where a program counter is and examining physical memory to determine where the address is. For systems executing multiple programs the memory mapping varies dynamically and readily transitions between memory pages. In such situations, the address translation significantly slows debug message generation and interpretation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates in diagram form one form of a development control register of FIG. 2;

FIG. 4 illustrates in table form exemplary encodings of control fields in the development control register of FIG. 3;

FIG. 5 illustrates in diagram form an exemplary program trace message;

FIG. 6 illustrates in diagram form an exemplary data trace message;

FIG. 9 illustrates in tabular form, functionality of a portion of the debug status register of FIG. 7, in accordance with one form of the present invention;

FIGS. 10 and 11 illustrate, in a tabular form, functionality of a portion of the debug control register of FIG. 8, in accordance with one embodiment of the present invention;

FIG. 12 illustrates in diagram form a debug status register associated with the debug registers of FIG. 7, in accordance with one form of the present invention;

FIG. 14 illustrates in diagram form an address-type selection control register associated with the debug control circuitry of FIG. 13, in accordance with one form of the present invention; and FIG. 15 illustrates in a tabular form, functionality of a portion of the address-type selection control register of FIG. 14, in accordance with one embodiment of the present invention.

DETAILED DESCRIPTION

Figure 1:
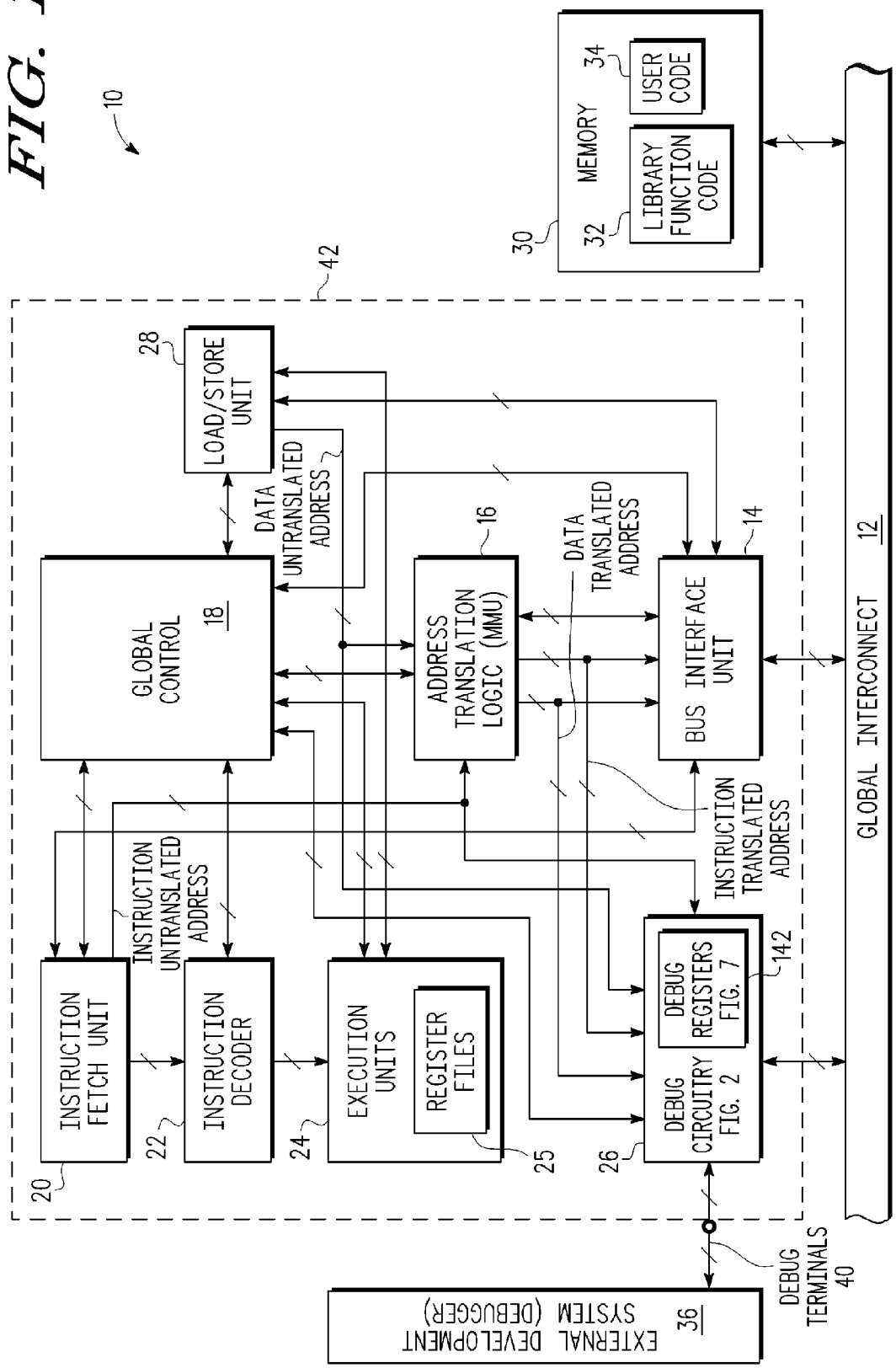
FIG. 1 illustrates in block diagram form a data processing system having address-type selection control in accordance with one form of the present invention.
Figure 2:
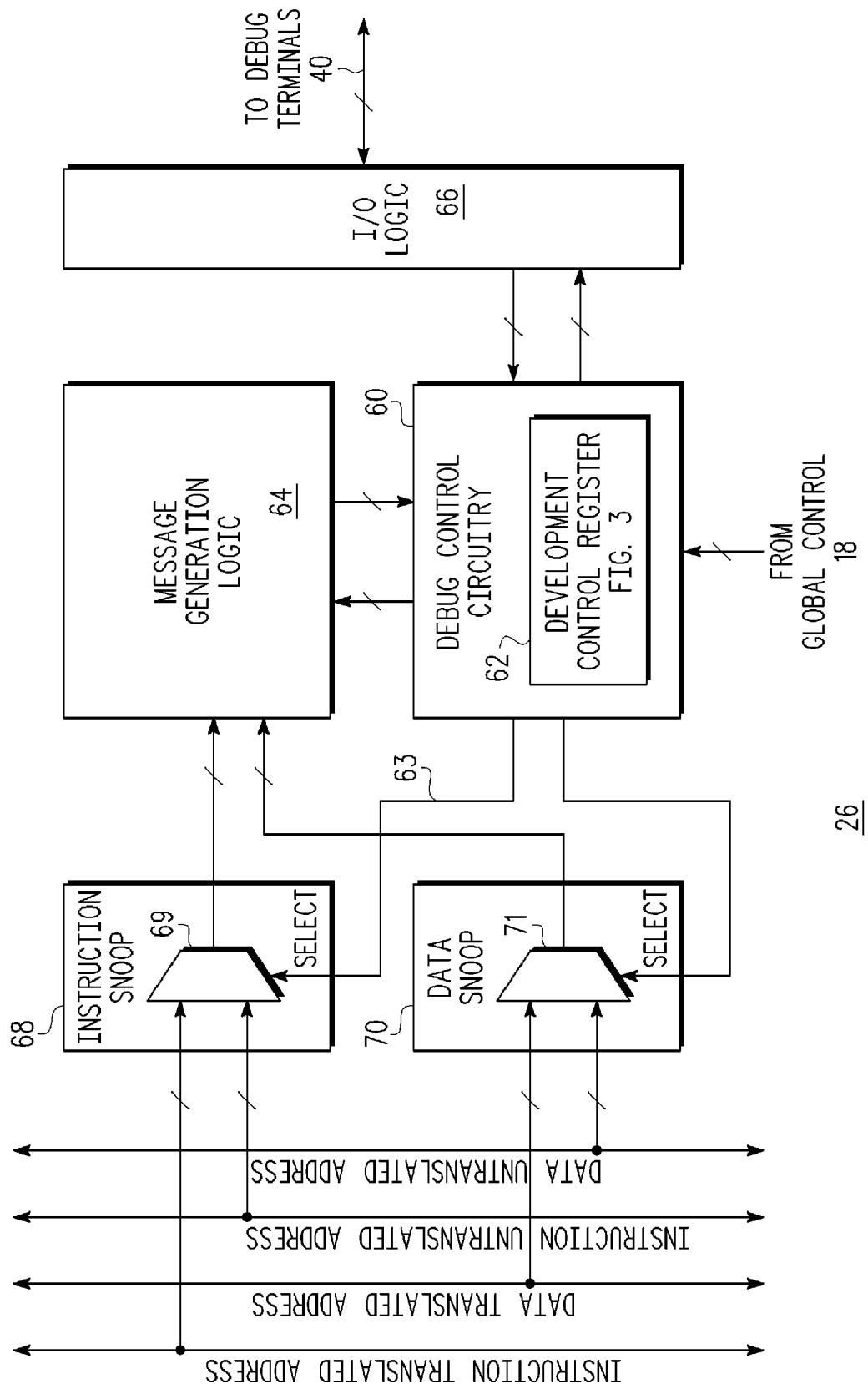
FIG. 2 illustrates in block diagram form one form of the debug circuitry of FIG. 1.

Illustrated in FIG. 1 is a data processing system 10 that generates debug messages having address-types of a type that is dynamically selectable by user control. As used herein the term "address-types" refers to various categories of addresses such as translated addresses versus untranslated addresses. Examples of untranslated addresses include logical addresses, virtual addresses and effective addresses. Examples of translated addresses include real addresses and physical addresses. Translated addresses may also include virtual addresses where virtual addresses have been translated from effective addresses. Within data processing system 10 is a global interconnect 12. In one form the global interconnect 12 is a system bus. Other forms of interconnect may be used including, for example, crossbars, point-to-point connections, and optical and wireless transmission techniques. A bus interface unit 14 is coupled to the global interconnect 12 via a bidirectional coupling. In one form the bidirectional coupling is a bidirectional multiple conductor bus wherein multiple conductor buses herein are represented with a slash across the conductor. The bus interface unit 14 is bidirectionally coupled to an address translation logic unit 16 which functions as a memory management unit (MMU). The address translation logic unit 16 is coupled to a first input/output terminal of a global control circuit 18 via a bidirectional multiple conductor bus. A second input/output terminal of the global control circuit 18 is coupled to a first input/output terminal of an instruction fetch unit 20 via a bidirectional multiple conductor bus. The instruction fetch unit 20 has an output coupled to an input of an instruction decoder 22 via a multiple conductor bus. An output of the instruction decoder is coupled to an input of execution units 24. In one form the execution units include at least one arithmetic logic unit, at least one floating point unit and at least one multiplier circuit. Within the execution units 24 are register files 25. An input/output terminal of instruction decoder 22 is coupled to a third input/output terminal of the global control circuit 18. An input/output terminal of execution units 24 is coupled to a fourth input/output terminal of the global control circuit 18. Debug circuitry 26 has an input/output terminal coupled to a fifth input/output terminal of the global control circuit 18. Within the debug circuitry 26 is a plurality of debug registers 142 that are detailed in FIG. 7. The remainder of debug circuitry 26 is illustrated in FIG. 2. A load/store unit 28 has an input/output terminal bidirectionally coupled to a sixth input/output terminal of the global control circuit 18. The load/store unit 28 has an input coupled to a first output of the bus interface unit 14. A second output of the bus interface unit 14 is coupled to an input of the global control circuit 18. An output of the load/store unit 28 provides a data untranslated address and is coupled to a first input of the address translation logic unit 16 and a first input of the debug circuitry 26. An output of the instruction fetch unit 20 provides an instruction untranslated address and is coupled to a second input of the address translation logic unit 16 and a second input of the debug circuitry 26. A first output of the address translation logic unit 16 provides a data translated address and is coupled to a first input of the bus interface unit 14 and to a third input of the debug circuitry 26. A second output of the address translation logic unit 16 provides an instruction translated address and is coupled to a second input of the bus interface unit 14 and to a fourth input of the debug circuitry 26.

A memory 30 is coupled to the global interconnect 12 via a bidirectional coupling. The memory 30 has a first portion of code that is non-user code or library function code 32. This code portion represents, for example, code for implementing specific functions or tasks and providing fixed data values. Such sets of instructions simplify work and prevent duplication of effort each time a particular task needs to be carried out. The library function code 32 prevents a programmer from having to rewrite the instructions themselves each time they are needed. The library function code 32 includes standard routines for a particular programming language. The memory 30 has a second portion of code that is user code 34 and is software provided by users of the data processing system 10. User code or programs thus differ from an operating system which runs a computer and a utility which performs maintenance or general-purpose chores. Depending upon the implementation need, user code 34 can manipulate text, numbers, graphics or a combination of these elements. Some user code offers considerable computing power by focusing on a single task such as word processing. Other user code implements less processing power but includes several applications such as, for example, word processing, spreadsheets and a database program. User code may be of any type implementing any algorithms, including real-time embedded control algorithms. Library function code 32 may also include OS code, or OS code may be located separately within memory 30 outside of library function code 32 or user code 34. The debug circuitry 26 has a second input/output terminal coupled to a plurality of debug terminals 40 via bidirectional multiple conductors. The plurality of debug terminals 40 is coupled to an external development system 36 that is commonly referred to as a debugger or external debugger. In the illustrated form the bus interface unit 14, the address translation logic unit 16, the global control circuit 18, the instruction fetch unit 20, the instruction decoder 22, the execution units 24 with register files 25, the debug circuitry and the load/store unit 28 collectively form a data processor 42 as indicated by the dashed line grouping in FIG. 1. While the global control circuit 18 is illustrated in FIG. 1 in a segregated location, it should be well understood that the circuitry and functional control of global control circuit 18 may also be implemented in a distributed manner and be included within any of the various other system blocks of data processing system 10.

In operation, the data processing system 10 communicates with devices (not shown) via the global interconnect 12. All information communicated with the data processor 42 transfers through the bus interface unit 14. The instruction fetch unit 20 retrieves data processing instructions from the bus interface unit 14 under control of the global control circuit 18. The retrieved instructions are sequentially communicated to the instruction decoder 22 for decoding under control of the global control circuit 18. The execution units 24 execute instructions and generate data that is either stored in a cache (not shown) or placed in the memory 30 via coupling through the global control circuit 18, the bus interface unit 14 and the global interconnect 12. Debugging of the operation of data processor 42 and data processing system 10 is performed by the use of debug circuitry 26 that generates debug messages for analysis by the external development system 36. A test (or debug) mode of operation is entered in response to activation of such from the external development system 36. In the illustrated form the debug circuitry 26 is configured to receive four different addresses which are either a data address or an instruction address. A data address is an address where data resides whereas an instruction address is an address where an instruction resides. Instruction untranslated addresses are provided from the instruction fetch unit 20 to the debug circuitry 26 and to the address translation logic unit 16. An untranslated address is an address which requires some further processing or translating to obtain the address of the physical storage location where the information is residing. The address translation logic unit 16 provides instruction translated addresses to the debug circuitry 26 and bus interface unit 14. In one form the untranslated addresses may be logical addresses which are often also referred to as virtual addresses. In another form the untranslated addresses may be effective addresses. Effective addresses must first be translated into virtual addresses before being translated into physical addresses. The load/store unit 28 provides data untranslated addresses to the debug circuitry 26 and to the address translation logic unit 16. The address translation logic unit 16 provides data translated addresses to the debug circuitry 26 and bus interface unit 14. The address translation logic unit 16 operates under control of the global control circuit 18 to ensure that the debug circuitry 26 receives a translated address and an untranslated address associated with a same processor operation. In response to receiving the translated address and the untranslated address, a value of one or more control indicators or control bits is determined. Based on the value of the one or more control indicators, either the translated address or the untranslated address is chosen as a selected address. The debug circuitry then forms a debug message for the external development system 36 using at least a portion of the selected address by including a portion, if not all, of the selected address in the debug message. In one form the debug message is created by first compressing the selected address into a smaller sized selected address having fewer bits. At least a portion of the compressed selected address is then used as a portion of the debug message. The format of the debug message may vary and examples will discussed below in connection with FIGS. 5 and 6. In one form the debug message may include, in addition to at least a portion of the selected address, a field that indicates whether the selected address is the translated address or the untranslated address. The control indicators will be described in below in connection with FIG. 2. In one form a software program contained in the user code 34 and library function code 32 of memory 30 is executed. The control indicator or indicators have values that are set based upon a type of the software program being debugged. For example, if the software program is a user program (user type), the control indicator assumes a first binary value. If the software program is a non-user program (non-user type), such as certain portions of library code or OS code, the control indicator assumes an opposite second binary value. In another form the one or more control indicators in the debug circuitry 26 include a first control bit that indicates whether translated or untranslated addresses are to be used for creating a program trace debug message and a second control bit that indicates whether translated addresses or untranslated addresses are to be used for creating a data trace debug message. Specific control indicators can also be associated with whether a program trace test function is being performed or whether a data trace test function is being performed.

Illustrated in FIG. 2 in an exemplary embodiment of a portion of the debug circuitry 26 of FIG. 1. Debug control circuitry 60 has an input/output terminal coupled to the global control circuit 18. Within the debug control circuitry 60 is a development control register 62. A first output of the debug control circuitry 60 is coupled to a first input of a message generation logic 64 which is debug message generation circuitry for generating a debug message. An output of the message generation logic 64 is coupled to a first input of the debug control circuitry 60. A second output of the debug control circuitry 60 is coupled to an input of Input/Output (I/O) logic 66. An input/output terminal of the I/O logic 66 is coupled via bidirectional multiple conductors to the debug terminals 40. An instruction snoop circuit 68 has a multiplexor 69 having a first input coupled to the instruction translated address of FIG. 1. A second input of multiplexor 69 is coupled to the instruction untranslated address of FIG. 1. An output of multiplexor 69 is coupled to a second input of the message generation logic 64. Multiplexor 69 has a control input for receiving a first select signal from a third output of the debug control circuitry 60. A data snoop circuit 70 has a multiplexor 71 having a first input coupled to the data translated address of FIG. 1. A second input of multiplexor 71 is coupled to the data untranslated address of FIG. 1. An output of multiplexor 71 is coupled to a second input of the message generation logic 64. Multiplexor 71 has a control input for receiving a second select signal from a fourth output of the debug control circuitry 60.

In operation, the message generation logic 64 is the logic circuitry which implements the function of forming the debug message pursuant to a selected one of a plurality of predetermined formats. The debug message is coupled to the debug control circuitry for routing to the debug terminals 40 via the I/O logic 66. Under control of the global control circuit 18, the debug control circuitry 60 also generates two select signals. A second select signal controls multiplexor 71 of the data snoop circuit 70 and functions to select one of the translated or the untranslated data address. In one form, the translated data address is a physical address of a data operand and the untranslated data address is a logical address of the data operand. A first select signal controls multiplexor 69 of the instruction snoop circuit 68 and functions to select one of the translated or the untranslated instruction address. In one form the translated instruction address is a physical address of an instruction operand and the untranslated instruction address is a logical address of the instruction operand. The debug control circuitry 60 uses one or more control indicators in the development control register 62 to decide whether to assert or negate the first select signal and the second select signal. In one form the one or more control indicators are implemented as control bits within the development control register 62. Both select signals may or may not be asserted at the same time and are independently controlled during the test or debug mode. The following figures will further describe the development control register 62 and the control indicator encodings as well as provide exemplary debug messages.

Illustrated in FIG. 3 is one example of a format of the development control register 62 of FIG. 2. The development control register 62 may be any bit size. In the illustrated form, a thirty-two bit implementation of the development control register 62 is provided. The bits zero through seventeen and bits twenty through twenty-nine are reserved. Bit eighteen is represented as a program trace address select (PTAS) control indicator or control bit. Bit nineteen is represented as a data trace address select (DTAS) control indicator or control bit. Bits thirty and thirty-one are trace mode, TM, control bits and are encoded to control modes of debug operation. In particular, the trace mode control bits control whether tracing is enabled and whether the enabled tracing is for program tracing or data tracing or for both. The PTAS control bit determines whether untranslated addresses or translated addresses for program addresses are selected. Similarly, the DTAS control bit determines whether untranslated addresses or translated addresses for data addresses are selected. The digital value of these control bits is monitored by the debug control circuitry 60 and the appropriate select signal is either enabled or not enabled depending upon their digital values. It should be well understood that the positioning of bit fields within the development control register 62 is arbitrary and may vary. Additionally, the number of control bits within each control indicator field may differ between implementations.

Illustrated in FIG. 4 is a table that illustrates the encoding of the PTAS, DTAS and TM fields in the development control register 62 of FIG. 3. When the PTAS control indicator bit has a logic zero value the program trace messages, when enabled, provide logical address values. When the PTAS control indicator bit has a logic one value the program trace messages, when enabled, provide physical address values. When the DTAS control indicator bit has a logic zero value the data trace messages, when enabled, provide logical address values. When the DTAS control indicator bit has a logic one value the program trace messages, when enabled, provide physical address values. The table in FIG. 4 also illustrates an encoding for the trace mode control field. When the two TM control indicator bits have a value of "00" no tracing is enabled. When the two TM control indicator bits have a value of "1X", program tracing is enabled wherein "X" is a 'does not matter' value. In other words, regardless of the value of the right-most bit, the program tracing function is enabled when the left-most bit has a logic one value. When the two TM control indicator bits have a value of "X1", data tracing is enabled. In other words, regardless of the value of the left-most bit, the data tracing function is enabled when the right-most bit has a logic one value. When both control indicator bits of the TM field are a logic one, both the data tracing function and the program tracing function are enabled. It should be understood that the illustrated encoding values are exemplary only and differing encodings may be implemented.

Illustrated in FIG. 5 is a first exemplary trace message 80. The trace message 80 has five illustrated fields. The positioning of the fields is arbitrary. An address field contains the address of the trace message 80. The type of address in this address field is the type that was selected. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies the trace message 80 as a program trace message having a particular predetermined field format. In the example of FIG. 5, the value that represents a program trace message with the illustrated form is "000100". An address-type field is an optional field and contains an indicator of the type of address being messaged. In other words the address-type field identifies whether the address field contains an address that is a virtual address or a physical address. This information, when included within the debug message, provides the trace reconstruction debug tool with the knowledge of the type of address being presented, and optionally may imply whether a trace listing should be generated.

Illustrated in FIG. 6 is another exemplary trace message 82. The trace message 82 has six illustrated fields. The positioning of the fields is arbitrary. A data value(s) field contains one or more data values associated with trace message 82. An address field contains the address of the trace message 82. The type of address in this address field is the type that was selected. A data size field contains a value that represents the length of the data or the number of bits contained in the data field. A source processor field contains a value that identifies what processor that the trace message 82 is associated with. This field information is valuable in multiple processor systems. A transfer code field contains a value that identifies the trace message 82 as a data trace message having a particular predetermined field format. In the example of FIG. 6, the value that represents a data write trace message with the illustrated form is "000101". The value that represents a data read trace message with the illustrated form is "000110". An address-type field is an optional field and contains an indicator of the type of address being messaged. In other words the address-type field identifies whether the address field contains an address that is a virtual address or a physical address. The positioning of the fields relative to each other and the bit size of each field are arbitrary and may vary between differing circuit design implementations.

Figure 7:
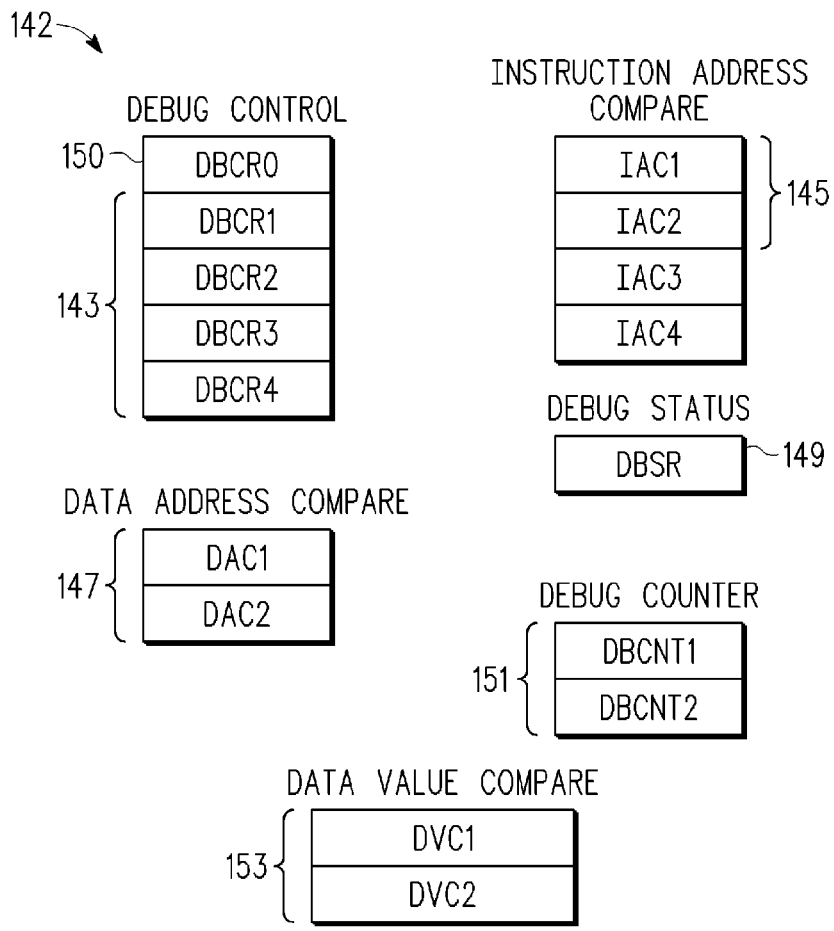
FIG. 7 illustrates in diagram form exemplary debug registers associated with the data processing system of FIG. 1.

Referring now to FIG. 7, registers within debug registers 142 may also be provided for storing one or more address comparison values, address ranges, and data match values for implementing instruction and/or data access breakpoint and watchpoint events, and other debug control criteria. These address and data values, along with various control criteria, are used to determine when data processor 42 accesses one or more predetermined instruction addresses or data addresses for the purpose of generating a breakpoint or watchpoint event, which can cause data processor 42 to begin exception processing for a debug exception when internal debug mode is active, or cause data processor 42 to enter a debug halted mode in which it responds to commands provided by external debug circuitry (not shown) through the debug port of internal debug circuitry 26 (to, for example, an external debug command register) when external debug mode is active. Additional event types may be detected and used to generate breakpoint or watchpoint events as well. That is, debug registers 142 may be used to configure debug events. By way of example, debug registers 142 may include various debug control registers, including debug control register 150 (DBCR0) and other debug control registers 143 (DBCR1, DBCR2, DBCR3, and DBCR4). Debug registers 142 may further include instruction address compare registers 145 (IAC1 and IAC2). Instruction address compare registers 145 may store instruction addresses for address comparison purposes. Debug registers 142 may further include data address compare registers 147 (DAC1 and DAC2). Data address compare registers 147 may store data access addresses for address comparison purposes. Debug registers 142 may further include debug status register 149, debug counters 151 (DBCNT1 and DBCNT2), and data value compare registers 153 (DVC1 and DVC2). Debug registers 142 may be a part of the user's software programming model. Debug counters 151 may be configured to count-down when one or more count-enabled events occur. When a count value reaches zero, a debug count event may be signaled, and a debug interrupt may be generated, if enabled. Data value compare registers 153 may store data values for data comparison purposes.

In internal debug mode (when external debug mode is not enabled), these register resources are managed by software (e.g. by debug software or a software debugger running on data processor 42), and no external debug circuitry usage is required. Software may configure the registers through data movement using move to and from special purpose register instructions which are programmers model software instructions to initialize the individual debug registers for performing software-based debugging activities, in which enabled debug events may cause software debug interrupts to occur. A software interrupt handler may then perform various desired activity which is determined by the software programmer of data processing system 10. In this internal debug mode, the debug resources of FIG. 7 are exclusively used and managed (i.e. owned) by software such that external debug hardware does not have access to these resources.

In external debug mode, the external debug circuitry (i.e. external development system (debugger) is assigned exclusive ownership of the debug resources of FIG. 7, and when a configured debug event occurs, data processor 42 may stop executing software instructions, and then enter a halted state and wait for a command to be provided by external development system 36 (where this halted state may also be referred to as hardware debug mode). Software (such as debug software executed by data processor 42) no longer has control of the debug resources when external debug mode is enabled. External development system 36 may access the debug resources, including debug registers 142, directly via the debug port (as shown in FIG. 2), which may be, for example, implemented as a JTAG TAP port. In one embodiment, debug registers 142 may be mapped as JTAG data registers with register selection encodings contained within one or more fields for the various JTAG instructions, which provide for read and write accesses to the registers by the debugger through JTAG IR and DR operations. As will be described in more detail below, in external debug mode, external development system 36 is able to allow software on data processor 42 (e.g. debug software or a software debugger running on data processor 42) to selectively manage a subset of the debug resources. That is, the external development system 36 is able to assign one or more debug resources, through the use of a debug resource control register, to software to manage. For example, external development system 36 is able to allow particular debug control register fields within debug registers 142 to be managed by software. Debug events which are managed by debug software (e.g. a software debugger) result in an interrupt which is handled by software (assuming interrupts are enabled), while debug events which are managed by hardware (e.g. the external debug circuitry) result in entry into hardware debug mode in which data processor 42 is halted and debugging is performed via the debug port by the external development system. In this manner, debug control register fields and other debug resources can be selectively managed or owned by hardware or software when one or more resources are shared between a software debugger and a hardware debugger. Furthermore, by external development system 36 being able to assign one or more debug resources for use by debug software, the external development system is capable of debugging the debug software itself.

Note that, as used herein, debug resources may include more or less registers than those included in debug registers 142. For example, debug resources may include instruction breakpoints, data breakpoints, various execution event breakpoints, as well as control and status fields to configure the resources and to report status on various events. A debug resource may also include one or more particular fields of a debug register. Debug resources may also include counters and comparators, as needed, to perform the debug operations. Also, sharing of a common set of control and status registers (such as debug registers 142), rather than having duplicate sets for a hardware debugger and a software debugger to manage, requires fewer data processor 42 resources to be implemented, and this simplifies the programming model for the user of data processing system 10. Internal debug circuitry 26 monitors activity within data processor 42 and in response to detecting one or more predetermined conditions based on stored debug configuration information, may generate one or more data breakpoint events, instruction breakpoint events, instruction execution events such as a branch or trap taken event, an instruction completion event, and the like. Each of these events can generate a corresponding watchpoint event. In this manner of operation, data processor 42 functions as can be appreciated by those skilled in the art.

Figure 8:
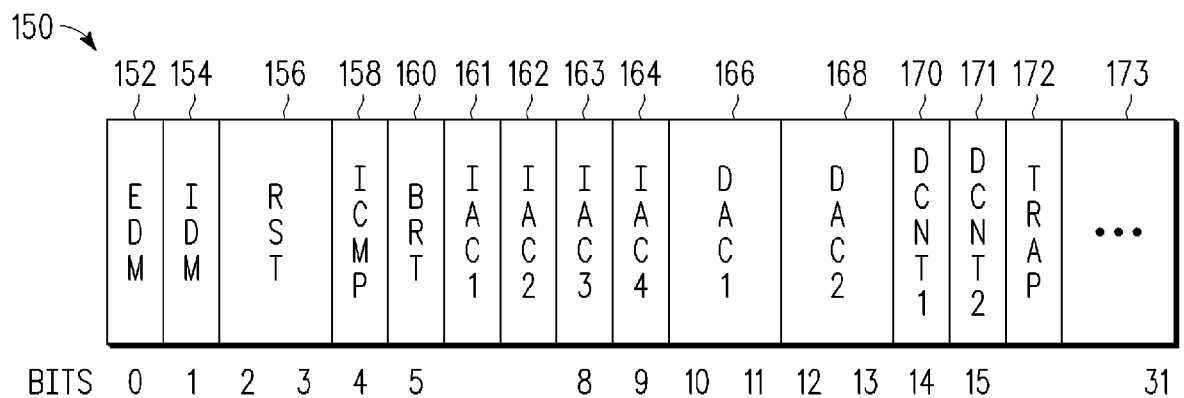
FIG. 8 illustrates in diagram form a debug control register associated with the debug registers of FIG. 7, in accordance with one form of the present invention.

FIG. 8 is a diagram of a debug control register 150 associated with the data processing system of FIG. 1. Debug control register 150 may be included as part of debug registers 142, which may further be included as part of internal debug circuitry 26. Debug control register 150 may be used to store debug configuration information. Although FIG. 8 illustrates a specific embodiment of the present invention which uses specific bit fields, alternate embodiments of the present invention may use different bit fields having different numbers of bits in each field. The specific bit fields depicted in FIG. 8 are shown only for illustrative purposes. By way of example, debug control register 150 may include thirty-two bits. Debug control register 150 may include bit fields labeled as: EDM 152, IDM 154, RST 156, ICMP 158, BRT 160, IAC1 161, IAC2 162, IAC3 163, IAC4 164, DAC1 166, DAC2 168, DCNT1 170, DCNT2 171, and TRAP 172. These bit fields are merely exemplary and debug control register 150 may include fewer or additional bit fields. In addition, these bit fields may be arranged differently. Also, note that each field may be referred to as a bit or bits or as a field. Debug control register 150 may also include reserved bit field 173 which may be used in the future. The functionality of the various bit fields is explained with respect to FIGS. 9 and 10 below. By way of example, debug control register 150 may be a writeable register that may also be readable and which may be part of the user's software programming model. In alternate embodiments of the present invention, debug control register 150 may not be a control register in the user's software programming model, but instead may be implemented outside of the user's software programming model. Any type of storage circuitry may be used to implement debug control register 150.

FIG. 9 shows, in a tabular form, functionality of debug status register 149 of FIG. 7. IDE bit 176 is used to indicate occurrence of an imprecise debug event and thus may be set to one if debug exceptions are disabled and a debug event causes its respective debug status register bit to be set to one. That is, although a debug event may occur, debug exceptions may remain disabled because an interrupt cannot yet occur due to a current state of the data processor 42 pipeline. ICMP bit 178 may be set to one if an instruction complete debug event occurred. BRT bit 180 may be set to one if a branch taken debug event occurred. IAC1 bit 182 may be set to one if an IAC1 debug event occurred. IAC2 bit 84 may be set to one if an IAC2 debug event occurred. IAC3 bit 186 may be set to one if an IAC3 debug event occurred. IAC4 bit 188 may be set to one if an IAC4 debug event occurred. DAC1R bit 190 may be set to one if a read-type DAC1 debug event occurred while DAC1 bit(s) 166 equal 0b10 or 0b11 (indicating that DAC1 debug events are enabled for load-type data storage accesses, as shown in FIG. 9). DAC1W bit 192 may be set to one if a write-type DAC1 debug event occurred while DAC1 bits 166 equal 0b01 or 0b11 (indicating that DAC1 debug events are enabled for store-type data storage accesses, as shown in FIG. 9). DAC2R bit 194 may be set to one if a read-type DAC2 debug event occurred while DAC2 bits 168 equal 0b10 or 0b11 (indicating that DAC2 debug events are enabled for load-type data storage accesses, as shown in FIG. 9). DAC2W bit 196 may be set to one if a write-type DAC2 debug event occurred while DAC2 bits 168 equal 0b01 or 0b11 (indicating that DAC2 debug events are enabled for store-type data storage accesses, as shown in FIG. 9). TRAP bit 197 may be set to one if a trap taken debug event occurred. DCNT1 bit 198 may be set to 1 if a DCNT1 debug event occurred. DCNT2 bit 199 may be set to one if a DCNT 2 debug event occurred. In one embodiment, bits 14 to 31 are reserved for possible future use. Also, in one embodiment, bits 101 are software dedicated bits, in which only software is able to access them.

FIG. 10 shows, in a tabular form, functionality of a portion of debug control register 150 of FIG. 7. EDM bit 152 may indicate whether the external debug mode is enabled or disabled. When EDM bit 152 is set to 1, for example, control registers, such as debug control register 150 are placed under exclusive control of external development system 36 and data processing system 10 software cannot write information to these control registers. Alternatively, when EDM bit 152 is set to 1, software cannot write to specific portions of debug control registers. Additionally, EDM bit 152 is used to selectively block certain reset events from clearing information stored in debug control register 150 and other debug resources, which may contain debug control and setup information. IDM bit 154 may indicate whether internal debug mode is enabled or disabled, thus indicating whether debug exceptions are enabled or disabled. RST bits 156 may be used to control reset functions. ICMP bit 158 may be used to indicate whether instruction complete debug events are enabled or disabled. BRT bit 160 may be used to indicate whether branch taken debug events are enabled or disabled. IAC1 bit 161 may be used to indicate whether instruction address compare 1 debug events are enabled or disabled. IAC2 bit 162 may be used to indicate whether instruction address compare 2 debug events are enabled or disabled. IAC3 bit 163 may be used to indicate whether instruction address compare 3 debug events are enabled or disabled. IAC4 bit 164 may be used to indicate whether instruction address compare 4 debug events are enabled or disabled.

With reference now to FIG. 11, FIG. 11 shows, in a tabular form, functionality of a portion of the debug control register 150 of FIG. 7. DAC1 bits 166 may be used to indicate whether data address compare 1 debug events are enabled or disabled. If enabled, DAC1 bits 166 also indicates for which type of storage accesses data address compare 1 debug events are enabled (for example, for store-type data storage accesses, for load-type data storage accesses, or for either load-type or store-type data storage accesses). DAC2 bits 168 may be used to indicate whether data address compare 2 debug events are enabled or disabled. If enabled, DAC2 bits 168 also indicates for which type of storage accesses data address compare 1 debug events are enabled (for example, for store-type data storage accesses, for load-type data storage accesses, or for either load-type or store-type data storage accesses). DCNT1 bit 170 may be used to indicate whether a debug counter 1 debug event is enabled or not. DCNT2 bit 171 may be used to indicate whether a debug counter 2 debug event is enabled or not. TRAP bit 172 may be used to indicate whether a trap taken debug event is enabled or not. Bits 173 (17:31) may be reserved for future use. Although FIGS. 10 and 11 describe a specific number of bit fields for providing different configuration information associated with debug events, different number of bit fields than shown in these figures may also be used.

FIG. 12 is a diagram of a debug status register 149 associated with the data processing system of FIG. 1. Debug status register 149 may be included as part of debug registers 142, which may further be included as part of internal debug circuitry 26. Debug status register 149 may be used to store status information on debug events. In one embodiment, when a bit in the debug status register 149 is set to '1', a corresponding control signal is generated which is used to either signal entry into a debug halted mode (for hardware debug events) or is used to generate a debug interrupt request to the processor (for software debug events). Although FIG. 12 illustrates a specific embodiment of the present invention which uses specific bit fields, alternate embodiments of the present invention may use different bit fields having different numbers of bits in each field. The specific bit fields depicted in FIG. 12 are shown only for illustrative purposes. By way of example, debug status register 149 may include thirty-two bits. Debug status register 149 may include bit fields labeled as: IDE 176, ICMP 178, BRT 180, IAC1 182, IAC2 184, IAC3 186, IAC4 188, DAC1R 190, DAC1W 192, DAC2R 194, DAC2W 196, TRAP 197, DCNT1 198, DCNT2 199, and software dedicated bits 14-31. These bit fields are merely exemplary and debug status register 149 may include fewer or additional bit fields. In addition, these bit fields may be arranged differently. Also, note that each field may be referred to as a bit or bits or as a field. Debug status register 149 may also include reserved bit fields 200, which may be used in the future. The functionality of the various bit fields is as explained above. Also, in referring to debug status register 149, setting a bit refers to storing a logic level one and clearing a bit refers to storing a logic level zero. By way of example, debug status register 149 may be a register whose bits are set via hardware, and read and cleared via software and which may be part of the user's software programming model. In alternate embodiments of the present invention, debug status register 149 may not be in the user's software programming model, but instead may be implemented outside of the user's software programming model. In one embodiment, debug status bits of debug status register 149 are set by debug events only while internal debug mode is enabled or external debug mode is enabled. In one embodiment, when debug interrupts are enabled in internal debug mode, a set bit in debug status register 149 may cause a debug interrupt to be generated, where the debug interrupt handler is responsible for clearing debug status register 149 bits prior to returning to normal execution. In one embodiment, when in external debug mode, the debug status bits of debug status register 149 are set by the hardware-owned debug events. If hardware has assigned any resources to software, then the debug status bits corresponding to those assigned resources are set by software-owned debug events, where, if interrupts are enabled, a set bit owned by software may cause an interrupt request signal to be generated and a debug interrupt to be taken and handled by software. Correspondingly, a set bit owned by hardware may cause a debug mode request signal to be generated and entry into a debug halted mode to occur, and be handled by the hardware debugger (external development system 36). Note that hardware-owned resources may also be referred to as hardware-managed resources and software-owned resources may also be referred to as software-managed resources. Furthermore, any type of storage circuitry may be used to implement debug status register 149.

In one embodiment, when debug interrupts are disabled in internal debug mode, or when internal debug mode is disabled, an event which normally would set a bit in debug status register 149 may cause a watchpoint event to be generated instead. In one embodiment, watchpoint events may be generated in addition to generating a debug interrupt. Alternate embodiments may generate watchpoint events in other ways to indicate the occurrence of a specific predetermined event.

Figure 13:
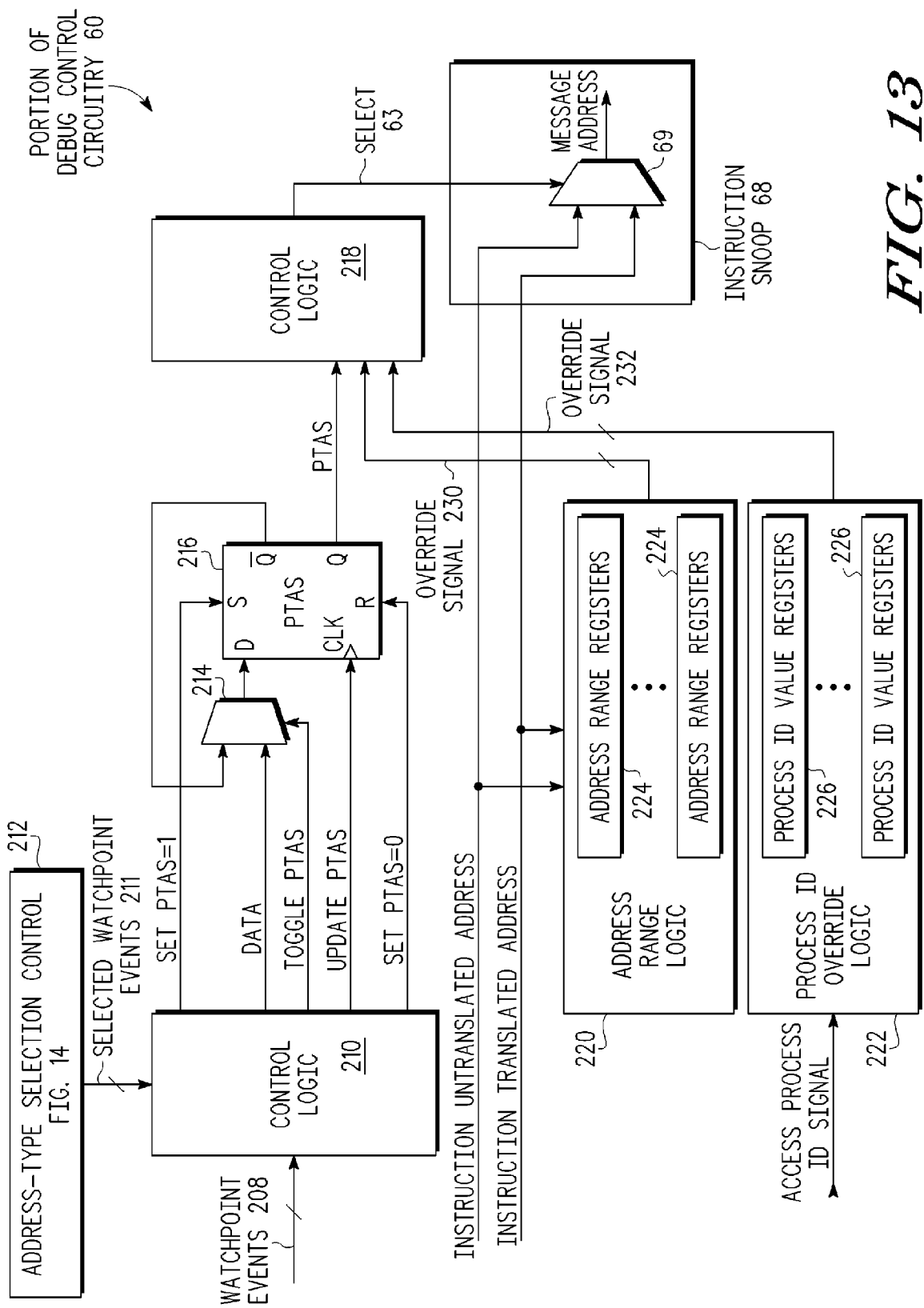
FIG. 13 illustrates in block diagram form a portion of the debug control circuitry of FIG. 2, in accordance with one form of the present invention.

Illustrated in FIG. 13 is a portion of the debug control circuitry 60 of FIG. 2. An address-type selection control register 212 has an output that is connected to a first input of control logic 210. A second input of control logic 210 receives a plurality of watchpoint events 208. It should be appreciated that other types of change of flow events could be implemented but in this form watchpoint events are received. A first output of the control logic 210 for providing Data is connected to a first input of a multiplexor 214. A second output of the control logic 210 for providing a Toggle PTAS signal is connected to a control input of the multiplexor 214. A third output of the control logic 210 for providing an Update PTAS signal is connected to a clock (CLK) input of a program trace address select (PTAS) flip-flop 216. A fourth output of the control logic 210 for providing a 'Set PTAS=0' signal is connected to a reset input of the flip-flop 216. A fifth output of the control logic 210 for providing a 'Set PTAS=1' signal is connected to a set input of the flip-flop 216. A data output labeled 'Q' provides a PTAS signal and is connected to a first input of control logic 218. A complementary data output of the flip-flop 216 is connected to a second input of the multiplexor 214. Address range logic 220 has a first input for receiving an instruction untranslated address and a second input for receiving an instruction translated address. The address range logic 220 includes a plurality of address range registers 224 for storing address range information. Process identifier or process ID override logic 222 has an input for receiving an access process ID signal. An output of the process ID override logic 222 is connected to a third input of the control logic 218. The process ID override logic 222 includes a plurality of registers such as the process ID value registers 226. An output of the control logic 218 is connected to a control input of multiplexor 69 of instruction snoop circuit 68 which is also illustrated in FIG. 2. As also illustrated in FIG. 2, the instruction snoop circuit 68 has a first input for receiving an instruction untranslated address and a second input for receiving an instruction translated address. An output of the multiplexor 69 provides the debug message address which, as illustrated in FIG. 2, is provided to the message generation logic 64 for use in generation of instruction trace messages. In one embodiment, program trace address select (PTAS) flip-flop 216 corresponds to PTAS bit 18 of development control register 62 of FIG. 3.

Although FIG. 13 shows the portion of debug control circuitry 60 used to select between a first and a second type of address for program trace messages, analogous logic exists in one or more alternate embodiments for controlling data trace message address selection. In such alternates, circuitry is used that corresponds to control logic 210, multiplexor 214, control logic 218, address range logic 220, process ID override logic 222, data snoop circuit 70 of FIG. 13, data snoop circuit 70 of FIG. 2 and an additional flip-flop (not shown) corresponding to DTAS bit 19 of development control register 62 of FIG. 3.

In operation, the debug control circuitry 60 that is illustrated in FIG. 13 functions to dynamically select between an untranslated address and a translated address based, in part, upon programmable control information stored in the address-type selection control register 212. As a result of the dynamic control provided by the use of the address-type selection control register 212, a user of data processing system 10 can dynamically control the program trace and data trace address for debug message generation. Contemporary real-time debug systems support real-time tracing of program flow by using program trace messaging and data trace messaging. Address information is contained as part of the debug message format. Such address information is typically only a virtual address. The use of a virtual address allows a debug user a method to trace program execution via a listing obtained with a compile and link operation. Because compilers and linkers only receive virtual addresses, a user typically has no information regarding how the virtual address is translated into a physical address by the operating system (OS). The constraints of the compiler and linker therefore require a user to implement debug messaging with only virtual addresses. Listings indicating how a physical address is translated are typically unavailable for pre-compiled software modules that are executed at runtime such as operating system calls and library functions. The debug control circuitry 60 therefore enables a user to properly trace and interpret these portions of instruction execution. Therefore, listings can be created real-time using trace reconstruction that relies on program trace messaging. Also, portions of the software being executed include user code and portions include operating system code. Debug control circuitry 60 permits the ability to automatically use an appropriate address-type (i.e. virtual address or physical address) when generating messages for the respective code and data sections using these two types of addresses. Debug control circuitry 60 allows a debug tool to selectively enable tracing using virtual addresses or physical addresses. A programmable selection criterion causes the control logic 210 to modify the control selector field at runtime based upon watchpoint events being matched. The address-type selection control register 212 provides a signal 211 that indicates the selected watchpoint events that will trigger a match indication. In one form the control logic 210 provides separate controls for program trace and data trace to allow either program information or data information to be controlled. The control logic 210 is implemented to provide for specific watchpoint event triggering to either: (1) select logical addresses; (2) select physical addresses; (3) select a default setting in the address-type selection control register 212; or (4) to toggle to an opposite mode from the default setting. These control selectors permit an appropriate type of address to be selected and the proper debug message to be generated for specific sections of a computer program.

Setting of watchpoints to indicate entry into and exit from sections of code may be implemented by the user of data processing system 10, and the corresponding occurrence of these watchpoints is then detected by control logic 210 as program execution proceeds. By detecting entry into or execution of predetermined sections of code corresponding to library and OS code and activating one or more watchpoint events, address-type selection control register 212 may be user configured to select translated addresses as the address-type to be provided when tracing these portions of code and the corresponding watchpoint events occur. Similarly, when returning back to user code, or while executing user code sections, additional watchpoint(s) may be generated, and the corresponding occurrence of these watchpoint(s) is then detected by control logic 210 as program execution proceeds. By detecting entry into or execution of predetermined sections of code corresponding to user code and activating one or more watchpoint events, address-type selection control register 212 may be user configured to select untranslated addresses as the address-type to be provided when tracing these portions of code and the corresponding watchpoint events occur. In operation, control logic 210 provides a signal which initially sets the flip-flop 216 to a known output value. When the flip-flop 216 is to be updated the control logic 210 provides the update PTAS signal to clock the flip-flop 216. If the flip-flop 216 is to be initialized with data from the user, such as on a write to development control register 62 of FIG. 3, the UPDATE PTAS signal is asserted by control logic 210, and the SET PTAS=1, SET PTAS=0 and TOGGLE PTAS control signals are negated. Control signals to PTAS flip-flop 216 are also provided by the control logic 210 in response to watchpoint events being signaled on the watchpoint events input (signal 211). The value of PTAS flip-flop 216 determines whether the control logic 218 will later select the received instruction untranslated address (e.g. a logical address) or the received instruction translated address (e.g. a physical address) as the message address. The multiplexor 214 receives both the data value from the control logic 210 and the complementary data output. In one configuration of address-type selection control register 212, a received watchpoint event will trigger an assertion of the Update PTAS and Toggle PTAS signals which causes the multiplexor 214 to select the complementary data output and change the state of the PTAS flip-flop 216 to the opposite state of the prior value of the PTAS signal. In another configuration of address-type selection control register 212, a received watchpoint event will trigger an assertion of the Update PTAS and Set PTAS=0 signals which causes the state of the PTAS flip-flop 216 to change to a logic 0 value. In another configuration of address-type selection control register 212, a received watchpoint event will trigger an assertion of the Update PTAS and Set PTAS=1 signals which causes the state of the PTAS flip-flop 216 to change to a logic 1 value. In summary, the PTAS signal is controlled based upon a match of dynamically alterable criteria and received watchpoints to indicate to the control logic 218 whether a translated or an untranslated address should be provided.

The debug control circuitry 60 of FIG. 13 implements an override feature with the process ID (process identifier) override logic 222. The process ID override logic 222 can control the selection of address-type independent of the selection made by address-type selection control register 212, control logic 210, multiplexor 214 and PTAS flip-flop 216. The process ID value registers 226 store predetermined values such as an address space ID or a process ID. For each memory access, the process ID override logic 222 receives an access process ID signal. When a match occurs with one of the stored process ID values, an override signal 232 is generated and sent to the control logic 218. The control logic 218 is implemented to generate a value for the select signal 63 in response to the override signal 232 to always select one of the untranslated or the translated addresses as the message address. When tracing a user program, the external development system 36 may use virtual addresses. When tracing library or system code, the external development system 36 may use physical addresses and then generate a program listing using trace reconstruction techniques supported by trace messaging information.

Certain processes, represented by a unique process ID, may want to override the normal address-type selection criteria performed by the logic value of PTAS flip-flop 216, such as when running an OS process or an alternate user support process. The process ID value(s) of these special processes may be stored in process ID registers 226, and accesses generated by execution of these processes detected by process ID override logic 222 provides an override signal to the control logic 218 which is implemented to force the select signal 63 to have a predetermined value and select a default address-type from one of the address-types. In one embodiment this predetermined value may be user programmable. In an alternate embodiment the predetermined value may be forced to a certain value in order to select translated addresses.

Another form of an override of the selection of address-type is implemented by the address range logic 220. The address range logic 220 functions to store a plurality of address range values in the address range registers 224. The address ranges are selectable to be either translated or untranslated addresses, or both. The address range logic 220 functions to compare the stored address range values with the received untranslated and translated addresses. When a current address falls within or equals one of the stored address values, the address range logic 220 provides an override signal to the control logic 218 which is implemented to force the select signal 63 to have a predetermined value and select a default one of the address-types. These control selectors allow the appropriate type of address to be selected and a correct debug message to be generated for specific sections of instruction execution within data processing system 10. By providing a user of the external development system 36 with an ability to specify the type of addresses to be messaged and the ability to dynamically change the type on-the-fly, program trace reconstruction may be used to debug a mix of both user and system code, regardless of the availability of program listings.

Illustrated in FIG. 14 is an example of one form of the address-type selection control register 212 associated with the debug control circuitry 60 of FIG. 13. By way of example only a thirty-two bit register implementation is illustrated. Any other bit size may be used. The address-type selection control register 212 has a plurality of watchpoint control fields respectively labeled WP0C through WP9C. In the illustrated form each field is a three-bit field. Other bit length fields may be implemented. The first two bits 1:0 are reserved and are not illustrated as being used.

Illustrated in FIG. 15 is an exemplary table that explains the digital encoding of the values in two of the watchpoint fields, fields WP0C and WP9C. For example, for watchpoint 0 event, four different encodings are explained for the respective bit values of 000, 001, 010 and 011. The value 1XX is reserved for data trace address selects (DTAS) control. The bits 29 through 31 may thus be programmed by a user so that various results are implemented when the watchpoint 0 event is detected by control logic 210. Depending upon the values of the three bits, one of: (1) no effect on PTAS; (2) toggle PTAS; (3) PTAS set to 0; or (4) PTAS set to 1 occurs. The other watchpoint events between zero and nine may be similarly encoded as indicated by the intervening dots in each column of the FIG. 15 table. It should be understood that the encodings are exemplary and other digital values may be assigned to these functions. Regardless of the encoding values, the address-type selection control register 212 functions to dynamically select what watchpoint functions will use what types of addresses in a debug message.

By now it should be appreciated that there has been provided a data processing system having one or more programmable selection criteria to cause a virtual address/physical address selector control to be modified at runtime based upon predetermined programmed criteria. Some of the criteria described include the matching of program watchpoints or breakpoints, the matching or process identifiers and the monitoring of predetermined address ranges. It should be understood that other criterion may be used. For example, other change of flow parameters may be selected as the criteria, such as system calls and returns, interrupt exception processing and returning from interrupts, traps or other program exception types, specific types of subroutine call and return instructions, and the like. The dynamic selection of address-types in debug messages permits improved debug visibility into the dynamics of a data processing system. A debugger thus is enabled with control to select the appropriate type of addressing information for the debug task at hand. When tracing a user program, the debugger may use virtual addresses. When tracing library or system code, the debugger may use physical addresses and then generate a program listing using trace reconstruction techniques supported by the trace messaging information. Based on a process ID being active or inactive, the appropriate selection of address-type may be made. Alternatively, when a user calls a user-mode dynamic library, an address range may be used to perform the proper selection of address-type.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary data processing system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. It should be noted that the boundaries between logic blocks are merely illustrative and that alternative embodiments may merge logic blocks or circuit elements or impose an alternate decomposition of functionality upon various logic blocks or circuit elements.

There is herein provided a method for generating a debug message in a data processing system. A translated address and an untranslated address associated with a same processor operation are received. An address-type indicator whose value is indicative of whether the translated address or the untranslated address is to be used for creating a debug message is provided. The value of the address-type indicator is selectively modified in response to an occurrence of one or more selected debug events. The translated address or the untranslated address is selected as a selected address based at least in part on the value of the address-type indicator. A debug message is created using at least a portion of the selected address. In another form debug event selection control information is provided to indicate the one or more selected debug events. In another form the debug event selection control information further indicates how to selectively modify the value of the address-type indicator in response to the occurrence of the one or more selected debug events. In a further form the value of the address-type indicator is selectively modified by setting the address-type indicator to a first predetermined value when the debug event selection control information has a first value. The address-type indicator is set to a second predetermined value different from the first predetermined value when the debug event selection control information has a second value. In another form the debug message is further characterized as a program trace debug message. In yet another form the value of the address-type indicator is determined and the address-type indicator is selectively overridden to select the translated address or the untranslated address as the selected address. In yet another form the address-type indicator is selectively overridden based on whether a process identifier associated with the same processor operation is at least one of a set of process identifiers. In another form the address-type indicator is selectively overridden based on whether at least one of the translated address or the untranslated address falls within a predetermined address range.

There is also herein provided a method for generating a debug message in a data processing system by receiving a translated address and an untranslated address associated with a same processor operation. An address-type indicator is provided which indicates whether the translated address or the untranslated address is to be used for creating a debug message. The address-type indicator is selectively overridden based on: (a) a process identifier associated with the same processor operation; or (b) based on whether at least one of the translated address or the untranslated address falls within one or more predetermined address ranges to select one of the translated address or the untranslated address as a selected address. A debug message is created using at least a portion of the selected address. In another form the selectively overriding of the address-type indicator is done by selectively overriding the address-type indicator based on whether the process identifier associated with the same processor operation is at least one of a set of process identifiers. In another form the selectively overriding of address-type indicator is implemented by selectively overriding the address-type indicator based on whether the at least one of the translated address or the untranslated address falls within the one or more predetermined address ranges. In another form the one or more predetermined address ranges are user programmable. In yet another form the address-type indicator is selectively overridden in response to when the translated address or the untranslated address falls within the one or more predetermined address ranges, selecting a first address from the translated address and the untranslated address as the selected address. When the translated address or the untranslated address falls outside the one or more predetermined address ranges, a second address, different from the first address, is selected from the translated address and the untranslated address as the selected address. In another form the debug message is a program trace debug message.

In yet another form there is herein provided a data processing system having address translation logic which translates an untranslated address associated with a processor operation of the data processing system to a translated address associated with the processor operation. Storage circuitry stores an address-type indicator whose value is indicative of whether the translated address or the untranslated address is to be used for creating a debug message. Modification circuitry selectively modifies the value of the address-type indicator in the storage circuitry in response to an occurrence of one or more selected debug events. Selection circuitry is provided that selects, based at least in part on the value of the address-type indicator, the untranslated address associated with the processor operation or the translated address associated with the processor operation as a selected address. Debug message generation circuitry generates a debug message corresponding to the processor operation using the selected address provided by the selection circuitry. In another form second storage circuitry, coupled to the modification circuitry, stores debug event selection control information which indicates the one or more selected debug events and how to selectively modify the value of the address-type indicator in response to the occurrence of the one or more selected debug events. In one form the modification circuitry sets the address-type indicator to a first predetermined value when the debug event selection control information has a first value, sets the address-type indicator to a second predetermined value when the debug event selection control information has a second value, and toggles the value of the address-type indicator when the debug event selection control information has a third value. In another form there is provided third storage circuitry, coupled to the modification circuitry, which indicates the occurrence of the one or more debug events. In another form there is provided override logic which, based on whether a process identifier associated with the processor operation is at least one of a set of process identifiers, provides an override indicator to the selection circuitry, wherein the selection circuitry selects the selected address based on the value of the address-type indicator and the override indicator. In yet another form the override logic provides an override indicator to the selection circuitry based on whether at least one of the translated address or the untranslated address falls within a predetermined address range. The selection circuitry selects the selected address based on the value of the address-type indicator and the override indicator.

Thus, it is to be understood that the systems and registers depicted herein are merely exemplary, and that in fact many other systems with circuitry can be implemented which achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Computer readable media used to implement the described structure and functions may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory module having two or more integrated circuit chips may be used. Typically each memory module will have a common support structure, such as a printed circuit board, but that is not required. Various type of memory circuits may be used to implement the cache and various register storage devices may be used to implement the described FIFOs. Other storage devices in addition to a FIFO may be used. For example, in some protocols a single, register storage could be implemented. In other embodiments a LIFO, last-in first-out storage device could be used. It should be understood that all circuitry described herein may be implemented either in silicon or another semiconductor material or alternatively by software code representation of silicon or another semiconductor material. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a debug message in a data processing system, the method comprising:
    receiving a translated address and an untranslated address associated with a same processor operation;
    providing an address-type indicator whose value is indicative of whether the translated address or the untranslated address is to be used for creating a debug message;
    selectively modifying the value of the address-type indicator in response to an occurrence of one or more selected debug events;
    selecting, based at least in part on the value of the modified address-type indicator, the translated address or the untranslated address as a selected address, wherein selecting includes overriding the address type indicator with the modified address-type indicator and determining the value of the modified address-type indicator to select the translated address or the untranslated address as the selected address; and
    creating a debug message using at least a portion of the selected address.

2. The method of claim 1, further comprising:
    providing debug event selection control information to indicate the one or more selected debug events.

3. The method of claim 2, wherein the debug event selection control information further indicates how to selectively modify the value of the address-type indicator in response to the occurrence of the one or more selected debug events.

4. The method of claim 3, wherein the selectively modifying the value of the address-type indicator comprises:
    setting the address-type indicator to a first predetermined value when the debug event selection control information has a first value; and
    setting the address-type indicator to a second predetermined value different from the first predetermined value when the debug event selection control information has a second value.

5. The method of claim 3, wherein the selectively modifying the value of the address-type indicator comprises:
    toggling the address-type indicator when the debug event selection control information has a first value.

6. The method of claim 1, wherein the debug message is further characterized as a program trace debug message.

7. The method of claim 1, wherein the selectively overriding the address-type indicator is performed based on whether a process identifier associated with the same processor operation is at least one of a set of process identifiers.

8. The method of claim 1, wherein the selectively overriding the address-type indicator is preformed based on whether at least one of the translated address or the untranslated address falls within a predetermined address range.

9. The method of claim 1, wherein the debug message is further characterized as a data trace debug message.

10. A method for generating a debug message in a data processing system, the method comprising:
    receiving a translated address and an untranslated address associated with a same processor operation;
    providing an address-type indicator which indicates whether the translated address or the untranslated address is to be used for creating a debug message;
    selectively overriding the address-type indicator based on a process identifier associated with the same processor operation or based on whether at least one of the translated address or the untranslated address falls within one or more predetermined address ranges to select one of the translated address or the untranslated address as a selected address; and creating a debug message using at least a portion of the selected address.

11. The method of claim 10, wherein the selectively overriding comprises:

selectively overriding the address-type indicator based on whether the process identifier associated with the same processor operation is at least one of a set of process identifiers.

12. The method of claim 10, wherein the one or more predetermined address ranges are user programmable.

13. The method of claim 10, wherein the selectively overriding the address-type indicator based on whether the at least one of the translated address or the untranslated address falls within the one or more predetermined address ranges comprises:

when the translated address or the untranslated address falls within the one or more predetermined address ranges, selecting a first address from the translated address and the untranslated address as the selected address; and when the translated address or the untranslated address falls outside the one or more predetermined address ranges, selecting a second address, different from the first address, from the translated address and the untranslated address as the selected address.

14. The method of claim 10, wherein the debug message is further characterized as a program trace debug message.

15. A data processing system, comprising:

address translation logic which translates an untranslated address associated with a processor operation of the data processing system to a translated address associated with the processor operation;

storage circuitry which stores an address-type indicator whose value is indicative of whether the translated address or the untranslated address is to be used for creating a debug message;

modification circuitry which selectively modifies the value of the address-type indicator in the storage circuitry in response to an occurrence of one or more selected debug events;

selection circuitry which selects, based at least in part on the value of the address-type indicator, the untranslated address associated with the processor operation or the translated address associated with the processor operation as a selected address;

override logic which, based on whether a process identifier associated with the processor operation is at least one of a set of process identifiers, provides an override indicator to the selection circuitry, wherein the selection circuitry selects the selected address based on the value of the address-type indicator and the override indicator; and debug message generation circuitry which generates a debug message corresponding to the processor operation using the selected address provided by the selection circuitry.

16. The data processing system of claim 15, further comprising:

second storage circuitry, coupled to the modification circuitry, which stores debug event selection control information which indicates the one or more selected debug events and how to selectively modify the value of the address-type indicator in response to the occurrence of the one or more selected debug events.

17. The data processing system of claim 16, wherein the modification circuitry sets the address-type indicator to a first predetermined value when the debug event selection control information has a first value, sets the address-type indicator to a second predetermined value when the debug event selection control information has a second value, and toggles the value of the address-type indicator when the debug event selection control information has a third value.

18. The data processing system of claim 16, further comprising:

third storage circuitry, coupled to the modification circuitry, which indicates the occurrence of the one or more selected debug events.

19. The data processing system of claim 15, further comprising:

override logic, which based on whether at least one of the translated address or the untranslated address falls within a predetermined address range, provides an override indicator to the selection circuitry, wherein the selection circuitry selects the selected address based on the value of the address-type indicator and the override indicator.

* * * * *